United States Patent [19]

vom Braucke et al.

[11] Patent Number: 4,993,727
[45] Date of Patent: Feb. 19, 1991

[54] COLLAPSIBLE HAND TRUCK

[75] Inventors: Manfred vom Braucke, Bielefeld; Hans vom Braucke, Vlotho, both of Fed. Rep. of Germany

[73] Assignee: Bielefelder Kuchenmaschinen-und Transportgerate-Fabrik, Bielefeld, Fed. Rep. of Germany

[21] Appl. No.: 379,971

[22] Filed: Jul. 14, 1989

[30] Foreign Application Priority Data

Jul. 26, 1988 [DE] Fed. Rep. of Germany ... 8809506[U]

[51] Int. Cl.⁵ .............................................. B62B 1/04
[52] U.S. Cl. ..................................... 280/40; 280/655; 280/47.29
[58] Field of Search .................. 280/40, 37, 655, 654, 280/655.1, 47.29, 47.315

[56] References Cited

U.S. PATENT DOCUMENTS

| 3,043,603 | 7/1962 | Major, Sr. | 280/40 |
| 3,960,252 | 1/1976 | Cassimally | 280/37 |
| 4,335,895 | 6/1982 | Walker | 280/40 |
| 4,401,319 | 8/1983 | Kazmark | 280/655 |
| 4,448,434 | 5/1984 | Anderson | 280/40 |
| 4,523,773 | 6/1985 | Holtz | 280/47.29 |
| 4,637,626 | 1/1987 | Foss et al. | 280/655.1 |
| 4,754,985 | 7/1988 | Im et al. | 280/40 |

FOREIGN PATENT DOCUMENTS

| 217650 | 10/1941 | Switzerland | |
| 1406272 | 9/1975 | United Kingdom | 280/40 |

Primary Examiner—David M. Mitchell
Attorney, Agent, or Firm—Burns, Doane, Swecker & Mathis

[57] ABSTRACT

A hand truck comprises a frame having upper and lower frame parts which can be pivoted between folded and unfolded positions. Pivotable locks retain the frame parts in both such positions. A pair of wheel braces are attached to the lower frame part for rotation between folded and unfolded positions. A carrier member is mounted to the lower frame part for rotation between folded and unfolded positions. The carrier member locks the wheel braces in their unfolded positions. The wheel braces carry tires which frictionally engage the carrier member to retain the wheel braces in their folded positions. The portion of the lower frame part which carries the wheel braces and carrier member can be separated from the lower frame part and then rotated ninety degrees before being reattached to the lower frame part in a stored condition.

19 Claims, 7 Drawing Sheets

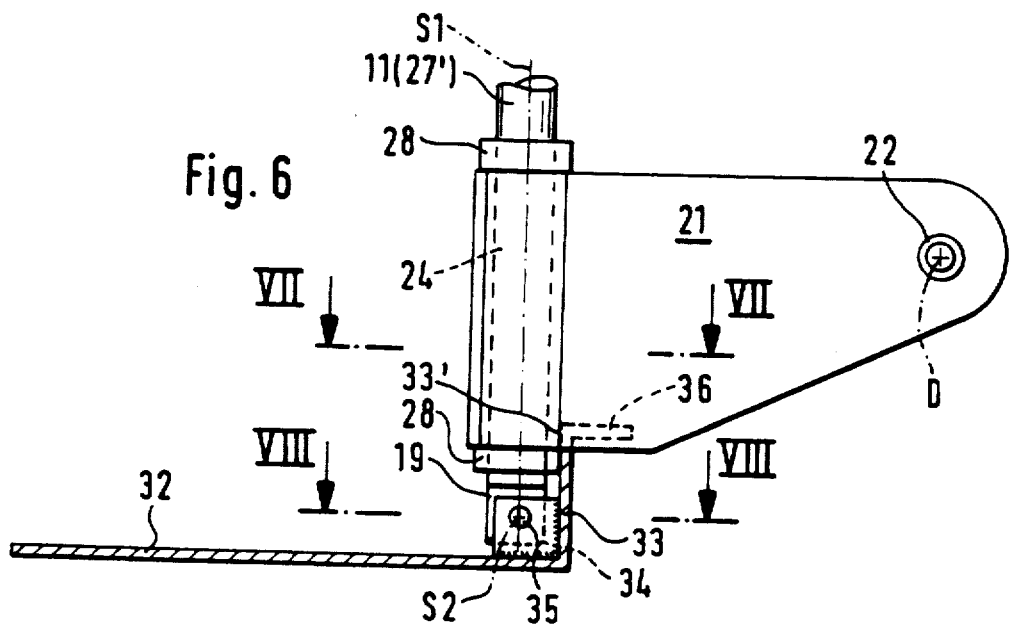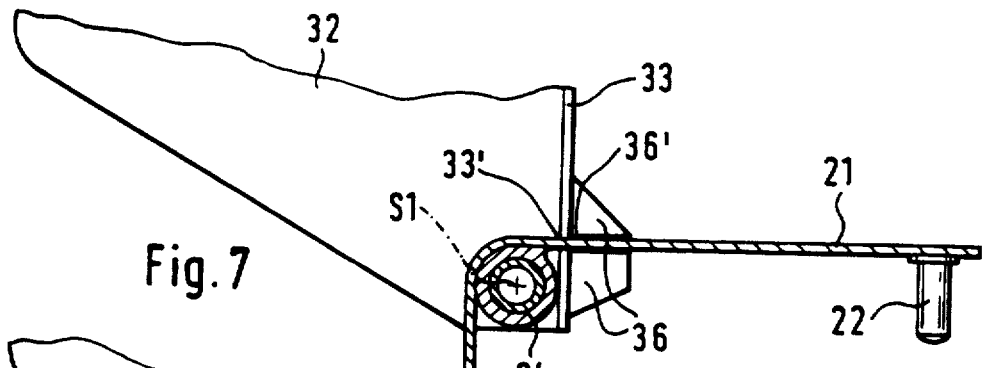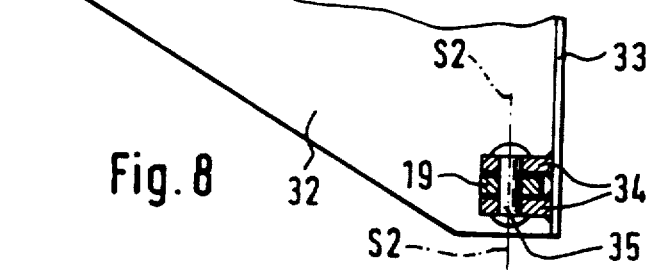

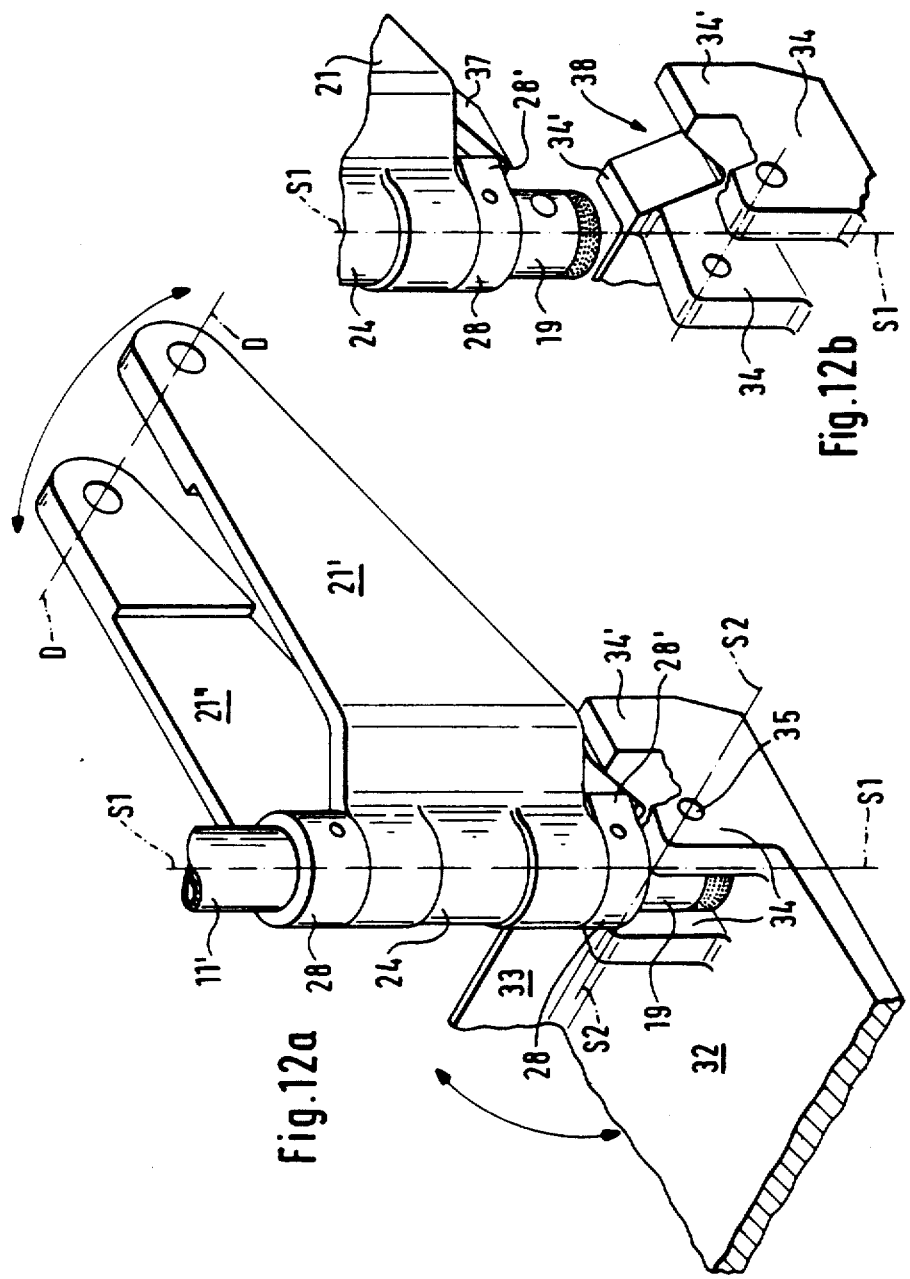

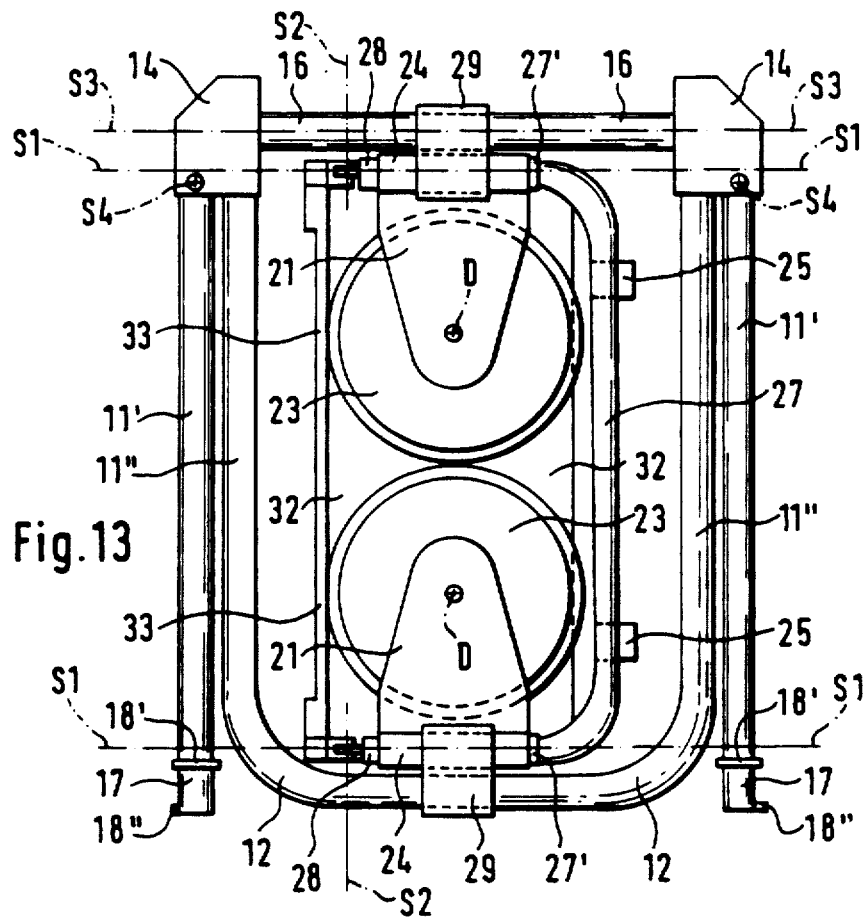
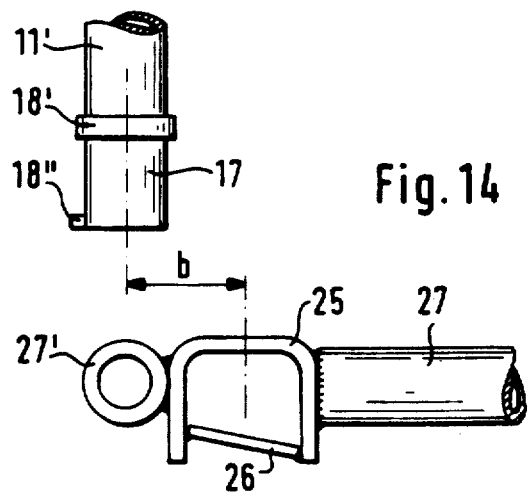

COLLAPSIBLE HAND TRUCK

BACKGROUND OF THE INVENTION

The invention concerns a two wheel hand truck or barrow of the type comprising a vertical frame, a pivotable carrier plate at a lower end of the frame, and two pivotably mounted wheel supports at a lower end of the frame.

There is a need, in many cases, to transport small loads in a simple and safe manner by a hand transport device, and it is desirable to be able to take the transport device along in a vehicle for use at an unloading site. Such occasions arise, for example, when moving purchases into a car and then from the car into a house. There are also applications during recreational activities, if for example, when preparing for a sailing trip the boat is to be equipped, numerous equipment items must be loaded on board, while in general the landing berth cannot be reached by car. In such cases, barrows may be used for transportation at both the loading and unloading sites. Both in private homes and if carried along in cars or on board a boat or the like, it is necessary to be able to fold the barrow as flat as possible while keeping its weight down.

Collapsible and light-weight barrows are known for example from U.S. Pat. No. 3,043,603. The barrows proposed therein comprise a rigid vertical frame with a transverse bar as the handle. A carrier or scoop is articulated at the lower end of the vertical frame in a manner pivoting around an axle extending transversely to the plane of the vertical frame. Also, at the lower end, wheel braces are provided, together with the wheels required for the rolling of wheel barrows. The wheels are capable of inward swiveling and are provided with safety means to secure the wheel braces in their unfolded position. This safety means, in the form of noses engaging recesses in the wheel bushing is not highly reliable. Also, in the case of slight controlling forces acting on the wheels, due to the great lever translation, the application of substantial forces to the locking nose must be expected, so that deformations in the area of the bearing bushing will render the pivoting of the wheels difficult.

A different type of fixing of the unfolded wheel braces is described in German Pat. No. 19 43 253, wherein the wheel brace is secured with a locking pin. The barrow also comprises a scoop plate that may be folded upward, making it possible to reduce the size of the vertical frame.

A very elaborate arrangement is described in German Pat. No. 19 82 824 wherein the inward pivoting of the wheels is forcibly combined with the shifting of the grip part of a sliding shackle.

Other wheel barrows, principally for the transportation of luggage are described in U.S. Pat. No. 4,335,895 and Swiss Pat. No. 217,650.

An object of the invention is to provide a barrow of the aforementioned type, which may be brought in a simple manner from the folded position into the unfolded (operating) position and vice versa. Such a barrow must be safely secured in its operating position and adapted to occupy the smallest possible space in the folded position. The barrow should also be of a light-weight construction and be capable of being manufactured economically.

SUMMARY OF THE INVENTION

These objects are attained by the present invention which pertains to a hand truck or barrow. The hand truck includes a frame, a pair of wheel braces, and a carrier member. The frame includes upper and lower frame parts. The upper frame part has a handle and is pivotably mounted to the lower frame part about a first axis for generally 180 degree movement between an upper unfolded position and a lower folded position. The frame also includes a locking structure movable between an unlocking position permitting the upper frame part to pivot about the first axis and a locking position preventing the upper frame part from pivoting about the first axis. The wheel braces are pivotably mounted to a bottom portion of the lower frame part for pivotal movement about second axes extending substantially perpendicular to the first axis. Free ends of the wheel braces carry ground support wheels. Each of the wheel braces is pivotable about its respective second axis between folded and unfolded positions. The carrier member is pivotably mounted to the bottom portion of the lower frame part for pivotal movement about a third axis extending substantially parallel to the first axis. The carrier member is pivotably movable about the third axis between folded and unfolded positions. The carrier member includes a main carrier plate and a second locking structure movable with the main carrier plate and engageable with the wheel braces when the carrier member and the wheel braces are in their unfolded positions to retain the wheel braces in their unfolded positions.

In a hand truck or barrow according to the present invention, the locking function of the unfolded wheel braces is assigned to the carrier member. This frees the wheel brace bearings at the lower end of the vertical profiles from the locking task, the spacing and thus the lever arm length are simultaneously increased, so that the forces acting against the lock in a locking element on the lower longitudinal profile are themselves significantly reduced. The division of the vertical frame into upper and lower frame parts by dividing the longitudinal profiles in a manner such that the upper profiles are articulated onto the lower profiles makes possible the complete fitting of the upper frame part into the lower frame part, even if the profile tubes are identical in thickness. The lower profiles are generally of such length that the wheel tires frictionally contact a lateral crossbar or handle of the frame, or with the carrier member to resist pivotal movement of the wheel braces out of their folded positions. The frame has locking means which safely lock the frame parts both in the folded and unfolded positions while engaging in both positions the upper end of the lower frame profile and the lower end of the upper frame profile. This configuration secures the frame in its folded state, which is essential if the folded barrow is, for example, to be transported in vehicles.

The locking means to secure the unfolded wheel braces may be located directly on the back of the carrier member or on pivot brackets for the carrier member and cooperate with the wheel braces themselves.

A third possibility is to mold the locking means onto the back of the carrier member itself, which renders possible cooperation also with moldings on the wheel braces. In order to obtain a secure seat and thus the correct alignment of the wheel braces, a conical or wedge-shaped or V-shaped projection/recess arrangement can be provided. Because the carrier member pivots freely, there is effected a "self adjusting" lock. Fundamentally, it is immaterial whether in the back of the carrier member recesses with wedge-shaped flanks are provided, which cooperate with one or both cross plates of a simple or double wheel brace, or whether a shoulder is present in the area of the extended pivot bracket with a seat having a V-shaped cross-section and a correspondingly shaped nose on the wheel brace, or whether the seat with the aforementioned configuration is molded onto the back of the carrier member. The positive lock produced in this manner enforces the alignment desired for the wheel braces when the carrier member is unfolded and stabilizes the wheel braces in such alignment, while the enlargement of the load applied to the carrier member has a progressively stabilizing effect.

It is advantageous if the wheel braces may be pivoted past the 90 degree operating position, because then, with the barrow in a prone position, the wheels are less likely to fall back into their folded position. The cone, wedge or V-shaped locking means are able to absorb this deviation and to produce the correct 90 degree position by the "fitting" provided by this type of engagement.

In order to secure the carrier member in the folded and unfolded positions, an elastic plug with a protruding bead is provided on the lower end of at least the lower profiles. That plug cooperates in a clamping manner with the main plate of the carrier plate, its back plate and/or the bearing brackets of the scoop. This makes it necessary to apply a certain force to pivot the carrier member from the folded and unfolded positions, i.e., more than a slight force would be necessary for actuating the swiveling motion.

It is advantageous to select a distance of the rotating axles of the wheels from the back of the folded carrier member, so that with the scoop and wheel braces folded, the tires of the wheels cooperate in a jamming fashion with the back of the carrier member. This frictionally secures the carrier member and the wheels in the folded position. As this clamping effect in the case of a straight back of the carrier member leads to a relatively high surface pressure, it is further advantageous, to corrugate the back of the carrier member in the clamping area in conformance to the wheel diameter. This configuration reduces the surface pressure at the same clamping force, thereby preventing the deformation of the readily flowing plastic wheel tires, particularly when transported in heated vehicles.

In order to make possible, when U-shaped wheel braces are used, to fold the barrow flatly so as not to exceed significantly the width of the tires, it is advantageous to provide recesses in the main plate of the carrier member, adapted at least to the shape and size of the wheel braces, so that with the carrier member and wheel braces folded, the wheel brace is located in that recess. The recesses may be large, or several recesses may be provided, with such recesses reducing the material used, together with the mass and thus the weight of the barrow.

By dividing the frame into two pivoted parts, the vertical frame is made foldable, to reduce its height. The upper profiles are articulated onto the opposing sides of the lower profiles by means of a pin connection, so that the upper frame part may pivot freely and come to rest in the space bordered by a lower frame part in a coplanar manner. Pivoting takes place around a swiveling axis lying parallel to the swivel axis of the carrier member, the swiveling axis being located in the plane of the vertical frame.

A safe handling of the barrow requires the securing of the upper frame part on the lower frame part in both the folded and unfolded position. For this purpose, the upper end of the lower profile is equipped with a freely rotating locking catch, which has a U-shaped cross-section to overlap both the upper end of the lower profile and the lower end of the upper profile. This locking catch secures the frame parts in both of the possible states. Additionally, the inner profiles of the upper part of the frame may be connected with a transverse shaft, the outer ends thereof being provided with elastic plugs which provide frictional clamping against the lower frame part. Another possibility of additional security consists of providing the free ends of the upper profiles with an elastic plug carrying a protruding bead. These protruding beads cooperate frictionally with the lower profiles. The securing of the locking catch provides additional safety. Safety is also present when the catch or at least an elastic finger thereof slightly overlaps the upper profile. If the locking catch is made of a sufficiently elastic material, for example a plastic, the catch walls themselves can frictionally engage the profile tubes, i.e., no separate finger would be needed.

Near the lower ends of the lower profiles there is provided a crossbar located at a distance from the wheel braces, which distance is longer than the radius of the wheel tire. The crossbar extends parallel to the pivot axis of the carrier member. This results in a stabilization of the lower vertical frame. If this crossbar is set onto the lower long profiles from the side opposite to the folded carrier member, an intermediate space is created between the carrier member and the crossbar. The advantage here consists of the fact that during the inward pivoting of the upper frame part following the release of the locking catches, the upper frame part may be swiveled until it abuts against the crossbar, and then is exactly in a position in which the locking catches can again be applied to secure this position. This cross-stay further provides the following advantages: if it is equipped with oblique slots and holes, an elastic rope may be attached to it which secures the load. If this elastic rope is wound several times between the crossbar adjacent the running gear and the center crossbar, a system to secure small parts is obtained, so that small packages or the like are prevented from falling through the vertical frame. In contrast to ropes with conventional fastening claws, the elastic rope clamped into the oblique slots may be of an arbitrary length and may be adjusted to secure the load as required, with the clamping being effected by passing the rope through a hole, deflecting it by 180 degrees and clamping it into an adjacent oblique slot. In addition, the lock bolt on the side of the running gear may also be used advantageously to fasten a tension element, second stationary anchor of which is provided on the back of the carrier member. This tension element, e.g., a spring or an elastic rope, provides a counter torque for the vertical frame of the standing, folded-up barrow, thereby preventing the tilting over of the vertical frame.

A particularly space saving advantage is obtained by the separation of the vertical frame from the running gear. The running gear and the carrier member are in a form such that the disconnected and folded running gear fits into the space formed by the folded upper frame part of the vertical frame. In this embodiment the wheel braces are articulated onto the bent over ends of a crossbar holding the running gear together, wherein the crossbar carries receptacles for receiving plug-in ends of the lower profiles. These plug-in ends are provided with locking noses which guard against an unintentional release, the insertion holders having an adequate width to receive the locking noses. As the entire vertical frame has a sufficient elasticity in itself, the lower ends of the lower profiles may be squeezed together for assembly, and then expanded to secure the plug-in ends within the receptacles. The seat of the vertical frame may be improved further by reducing the width of the insertion holders measured perpendicularly to the plane of the vertical frame to about the thickness of the plug-in end of the lower long profile. In any case, the depth of insertion of the plug-in ends in the insertion holder is preferably limited by adjustable stops.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIG. 6 is a fragmentary vertical sectional view taken through a lower portion of the hand truck depicting the manner in which the carrier member locks a wheel brace in its unfolded position;

FIG. 7 is a cross-sectional view taken along the line VII—VII in FIG. 6;

FIG. 8 is a cross-sectional view taken along the line VIII—VIII in FIG. 6;

FIG. 12a is a fragmentary perspective view of the lower portion of the hand truck depicting a different type of wheel brace and the manner in which it is locked by the carrier member;

FIG. 12b is an exploded perspective view of members depicted in FIG. 12a;

FIG. 13 is a front elevational view of a third embodiment according to the present invention, with the frame disposed in a folded condition, and with a bottom portion of the lower frame part being disposed in a separated condition and attached to the top portion of the lower frame part; and FIG. 14 is an exploded view of portions of the hand truck depicted in FIG. 13, with one of those portions rotated 90 degrees from its normal position.

DETAILED DESCRIPTION OF PREFERRED EMBODIMENTS OF THE INVENTION

Figure 1:
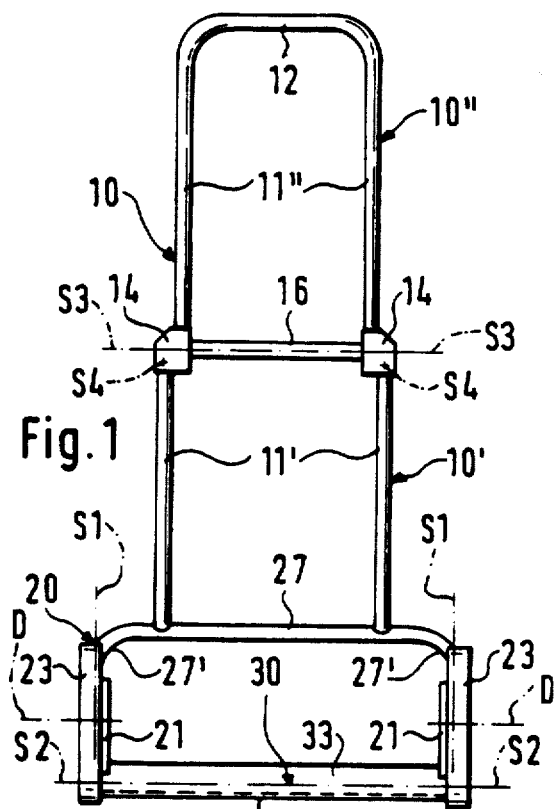
FIG. 1 is a front elevational view of a hand truck according to the present invention, when the hand truck is in an unfolded condition.
Figure 2:
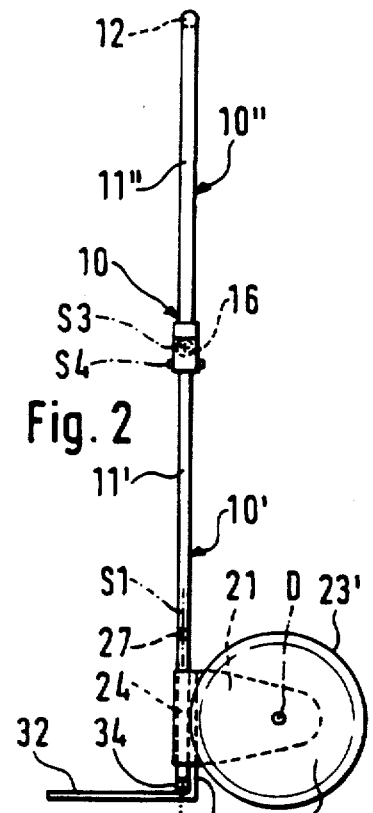
FIG. 2 is a side elevational view of the hand truck depicted in FIG. 1.
Figure 3:
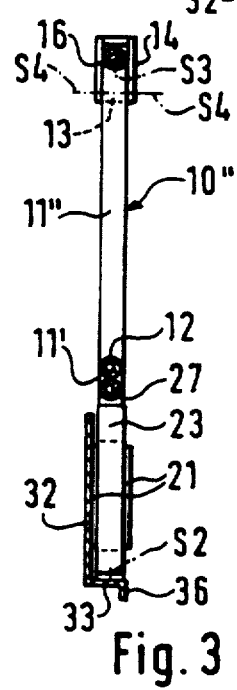
FIG. 3 is a vertical sectional view taken along the line III—III in FIG. 4 when the hand truck is in a folded condition.
Figure 4:
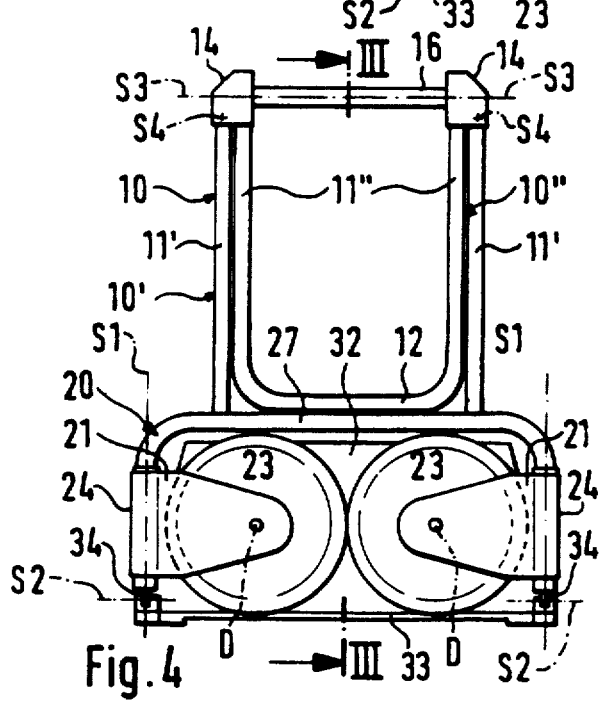
FIG. 4 is a front elevational view of the hand truck in a folded condition.

FIGS. 1 to 4 show a first embodiment of the hand truck or barrow, with a vertical frame 10, running gear 20 and load holding means 30 in the unfolded working position (FIGS. 1, 2) and in the folded transport position (FIGS. 3, 4). The vertical frame 10 comprises a lower frame part 10' and an upper frame part 10'', articulated to each other in a manner such that upper profiles or profile tubes 11'' of the upper frame are pivoted to the inside of lower profiles or profile tubes 11', whereby the upper frame part 10'' may be folded into a space bordered by the lower frame part 10' around a pivot axis S3 (see FIG. 4). A cross-stay 12 connects the two upper long profiles 11'' and forms a grip handle of the vertical frame. The articulation of the upper frame part 10'' on the lower frame part 10' is secured by lock catches 14 which, as will be later described, are able to rotate around pivot axes S4 and immobilize the profiles 11', 11'' selectively in the unfolded and folded positions (FIGS. 1, 4). The lower ends of the upper profiles 11'' are interconnected by a cross bar 16, which is located coaxially relative to the pivot axis S3.

At the lower end of the lower frame part 10' the running gear 20 is located. The lower ends of the lower profiles 11' are interconnected by a cross bar 27, the outward ends 27' of which are bent to be parallel to the lower ends of the lower profiles 11'. These bent ends 27' hold pivot bushings 24 for the wheel braces 21, with the wheel braces 21 being equipped with wheels 23 rotatable around an axle D. The wheels 23 are advantageously equipped with tires 23' to improve the rolling behavior and to absorb shocks. Each of the bushings 24 of the wheel braces 21 is rotatable around a pivot axis S1 defined by a respective bent end 27', so that it may be unfolded to the working position (FIG. 1, 2) and folded into the rest position (FIGS. 3, 4). In the folded position the bushings and wheels are located within the confines of a receiving space formed essentially by the crossbar 27 and lying in the plane of the frame 10. The load receiving means comprises a carrier member or scoop 30 mounted at the bottoms of the bent ends 27' for rotation about a pivot axis S2. The pivot axis S2 extends at right angles to the pivot axes S1 and is located in a plane defined by the pivot axes S1. The carrier member carries two pairs of brackets 34 (FIGS. 6, 8) at opposite sides, each pair of brackets straddling an ear 19 fixed to a respective bent end 27' and articulated thereto by a pin 35 which defines a pivot axis S2.

The carrier member 30 comprises a main plate 32 and a right-angled back plate 33, wherein the main plate 32 serves to support the load and the back plate 33 keeps the load from sliding off in operation, when the barrow is tilted. In the folded state (FIGS. 3, 4) the main plate 32 is oriented vertically immediately adjacent the plane of the lower crossbar 27 so that the thickness of the folded barrow (as viewed in FIG. 3) is determined essentially by the combined thicknesses of the tubing of the vertical frame, the main plate 32 and possibly the wheel brace 21.

Figure 5A:
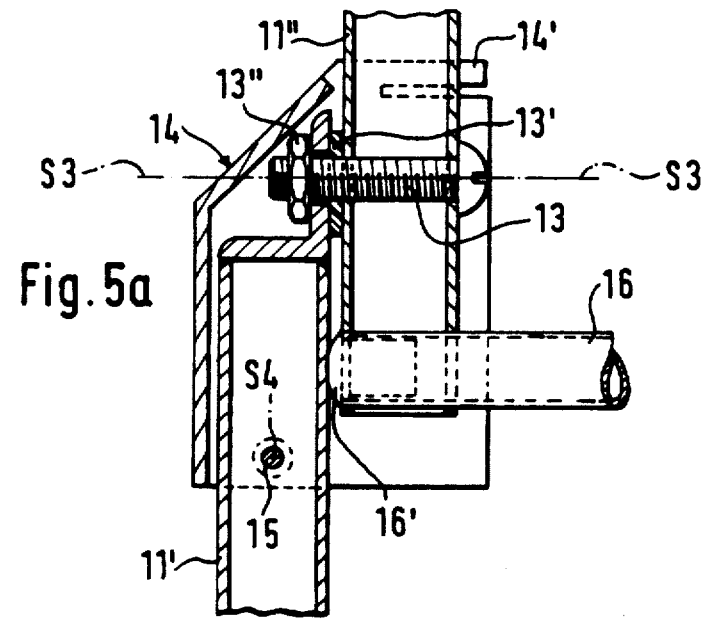
FIG. 5a is an enlarged vertical sectional view taken through a region where an upper frame part is pivotably connected to a lower frame part and the upper frame part is in an unfolded condition.
Figure 5B:
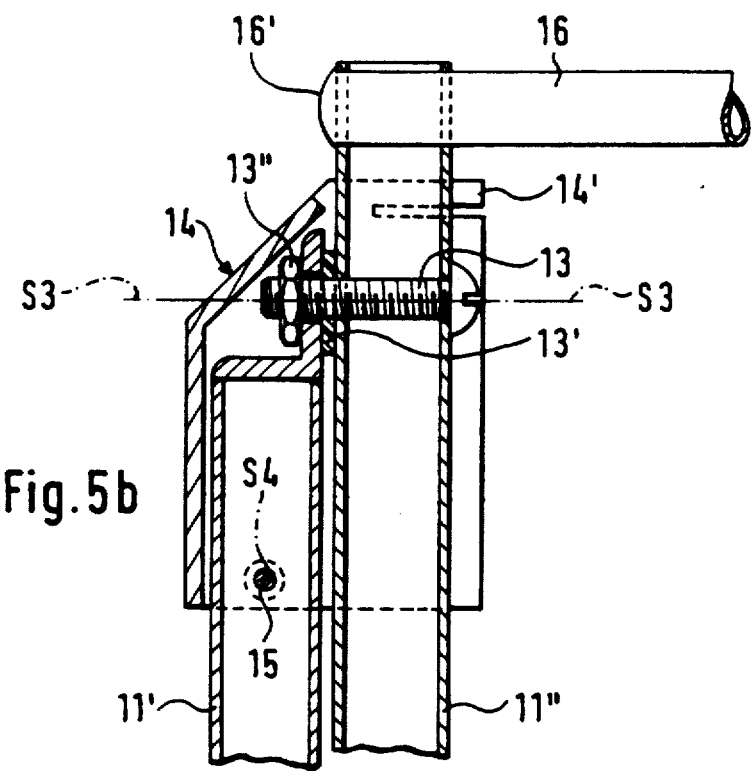
FIG. 5b is a view similar to FIG. 5a after the upper frame part has been pivoted to a folded position.

FIGS. 5a, 5b show the infolded and folded positions, respectively, for the upper and lower frame parts and the lock catch 14. Only one of the pivot connections is shown, the other being a mirror image thereof. The catch 14 is articulated around the pivot axis S4 (located at right angles to the plane of the drawing) by a pin 15 connected to the lower profile 11'. The upper profile 11" is pivotably mounted to an angle iron fixed onto the lower profile 11' by means of a pin 13 which is secured by a nut 13". A preferably elastic insert 13' is located between the angle iron and the upper long profile 11". By tightening the nut 13", a certain friction clamping of the upper profile 11" may be obtained while still permitting that profile to rotate generally 180 degrees about the axis S3 defined by the pin 13 after the catch 14 has been swung to an unlocking position (i.e., is swung counterclockwise from the FIG. 5a position). The ends of the upper profiles 11" facing away from the grip handle 12 are connected with each other by a crossbar 16, which is spaced farther from the handle 12 than is the axis S3. Each outer end of the crossbar 16 is closed by an elastic plug 16', which in the unfolded state of the frame is cooperating in a friction clamping manner with the lower profile 11' (FIG. 5a). In the folded state, the crossbar 16 forms a manual grip to simplify the handling of the folded barrow. To improve safety, at least one side of the catch 14 is provided with a notch to define a clamping finger 14' which elastically engages the upper profile 11". It will be appreciated that when using plastic injection molded products, the free edges of the walls of the catch 14 may be designed so as to bend around and grip the profile 11" from behind so as to require that the wall or finger 14' be flexed in order to permit the catch 14 to travel out of and into a locking position.

FIG. 6 shows the mounting of the wheel braces on the downwardly directed bent ends 27' of the crossbar 27. The bushings 24 are secured on those ends 27' by collars 28. The ear 19 of the downward bent end 27' is flat and engages between the brackets 34 on the main carrier plate 32 and receives the pin 35 which makes possible the pivoting of the carrier member around the axis S2. The wheel braces 21 are locked in their unfolded position by the carrier member. In the simplest case, the back wall 33 vertically overlaps the folded-out wheel brace 21 as depicted in FIG. 6. The back plate 33 has a recess or notch 33' extending at least to the lower edge of the wheel brace 21 (see FIG. 7). If the notch 33' is V-shaped at least at its upper end (i.e., if the walls of the notch converge in the direction in which the wheel brace enters the notch), no special holder is needed in order to properly position the wheel brace, because the notch 33' will cause the wheel brace to be pivoted to its proper position when the scoop is moved to its unfolded position. A stop 36 is provided on the rear of the back wall 33, which stop cooperates with the outside of the wheel brace 21 and prevents tipping over of the truck. It is obvious that this safety stop 36 may be provided on either side of the wheel brace 21, as the unfolding operation requires that first the wheel braces are unfolded, followed by the unfolding of the carrier member. It is further advantageous to provide the notch flanks 36' in the shape of a wedge. The wheel brace 21 has an axle journal 22 to hold the wheel 23 (FIG. 1), which wheel is set on the journal 22 from the outside and locked in by conventional means.

The wheels 23 can be arranged to elastically grip the back plate 33 when the wheels and carrier member are unfolded, so that the wheels 23 are frictionally held in the folded condition. The carrier member is retained in a folded condition as long as the wheels remain folded.

Figure 9:
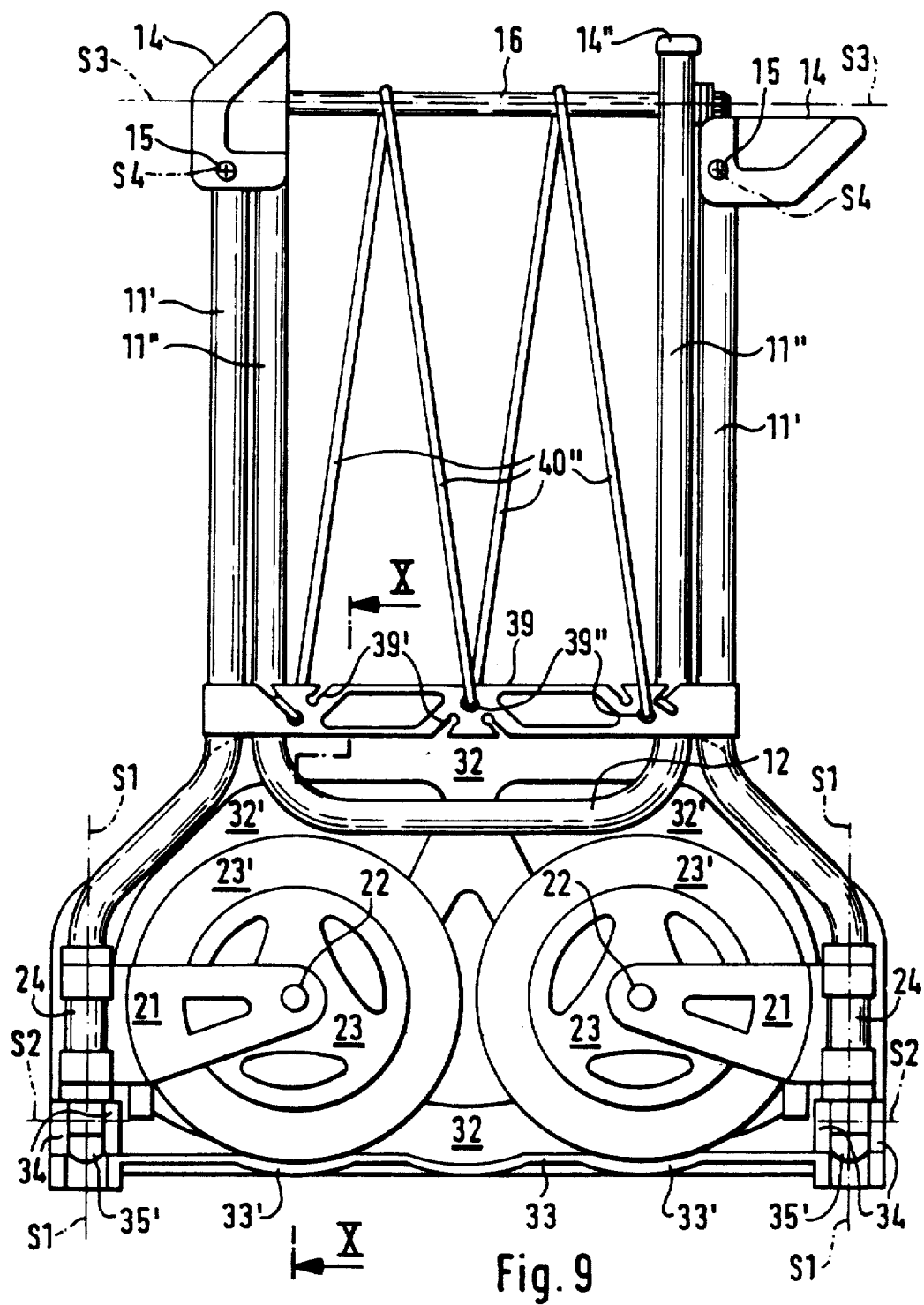
FIG. 9 is a front elevational view of a second embodiment of a hand truck according to the present invention, with the hand truck being in a folded position.

FIG. 9 shows a second embodiment of the barrow in the folded state, in which the lower ends of the lower profiles 11A' carry the bushings 24A for the wheel braces, without the provision of a crossbar similar to the crossbar 27 of FIG. 1. The folded upper frame, with the upper profiles 11A" and the cross-stay 12A forming the handle, is pivoted into the space bordered by the lower profiles 11A' with the axis S3 being coaxial with the center crossbar 16A in FIG. 9. Articulation is carried out in the manner described above in connection with FIGS. 1-8. The lock catches 14A secure, as described earlier, the folded and unfolded positions of the profiles 11A', 11A". The free end of each upper profile is closed by an elastic plug 14" which has an enlarged bead and cooperates in a frictional clamping manner with the catch 14A in that the spacing between the walls of the catch 14A is slightly smaller than the diameter of the enlarged bead of the elastic plug 14A". This resists the swiveling of the catches 14A around the pivot axis S4 and prevents the unintended release of the locked connection.

The lower ends of the lower profiles 11A' are bent outwardly in opposing directions and then downwardly within the plane of the frame. By means of bushings 24A which may be adjusted in height and fixed by means of set rings, the wheel braces 21A and thus the wheels 23A with their tires 23A' are pivotably held on the vertical frame. The wheels 23A are mounted on axle journals 22A, which provide for rotation around the axle D. The carrier member may be pivoted around the axis S2 at the lower ends of the lower profiles 11' by two pairs of brackets 34A. In order to obtain adequate security for the folded state of the wheels, the back plate 33A is wave-shaped to form pockets 33A', which are adapted to the shape of the tires 23A', so that a frictional clamping of the tires is obtained (see FIGS. 9, 10). This appreciably reduces the surface pressure and prevents tire deformation (which would result in a disagreeable "rumble" of the truck during use). To keep the thickness of the folded-up unit within limits, in spite of the presence of two brace plates 21A', 21A" per wheel brace 21, conveniently a recess 32A' is provided on the main plate 32A, at least in the area of the wheel braces. This recess receives the wheel braces 21A to minimize the width of the folded-up unit and in addition affords savings in material and weight (see FIG. 10). The lower ends of the lower profiles 11A' are closed by an elastic plug 35a' which is equipped with an enlarged bead which frictionally grips the brackets 34A in a clamping manner. This clamping is obtained both in the folded and unfolded states. It is evident that in the area of the clamping of the bead suitable recesses allow a certain "snapping in", while maintaining the clamping action. A lower crossbar 39A is mounted on the lower profiles 11A' and is conveniently provided with notches 39A' and holes 39A", which accept an elastic tubing 40A" which is wound alternately between the lower crossbar 39A and the center crossbar 16A. When the upper profiles 11A" are folded, they become retained between the crossbar 39A and the folded scoop plate. The rubber tubing forms a support to resist a chance for small carried objects to fall backwards off the carrier member.

Figure 10:
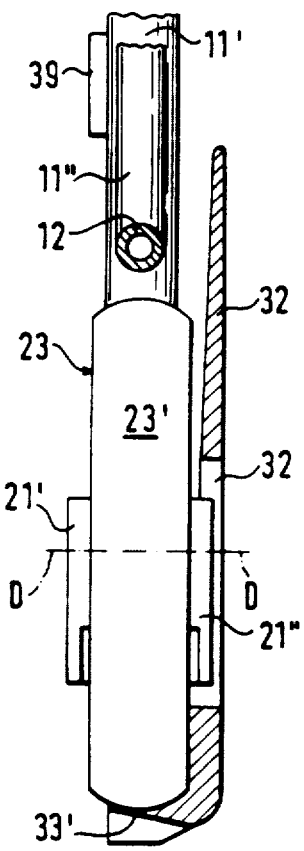
FIG. 10 is a vertical sectional view taken along the line X—X in FIG. 9.

In FIG. 10, the upper profile 11A' is shown with a lesser wall thickness than the lower long profile 11A" merely for the sake of clarity. In the folded state the recess 32A' receives the wheel brace 21A". The correspondingly shaped back plate 23A abuts clampingly against the tire 33A' of the wheel 23A. The wheel is thereby secured in the folded state. The upper part of the frame, together with the upper long profile 11A" and the transverse handle 12A is located between the folded main plate 32A and the lower crossbar 39A and is secured therebetween.

Figure 11:
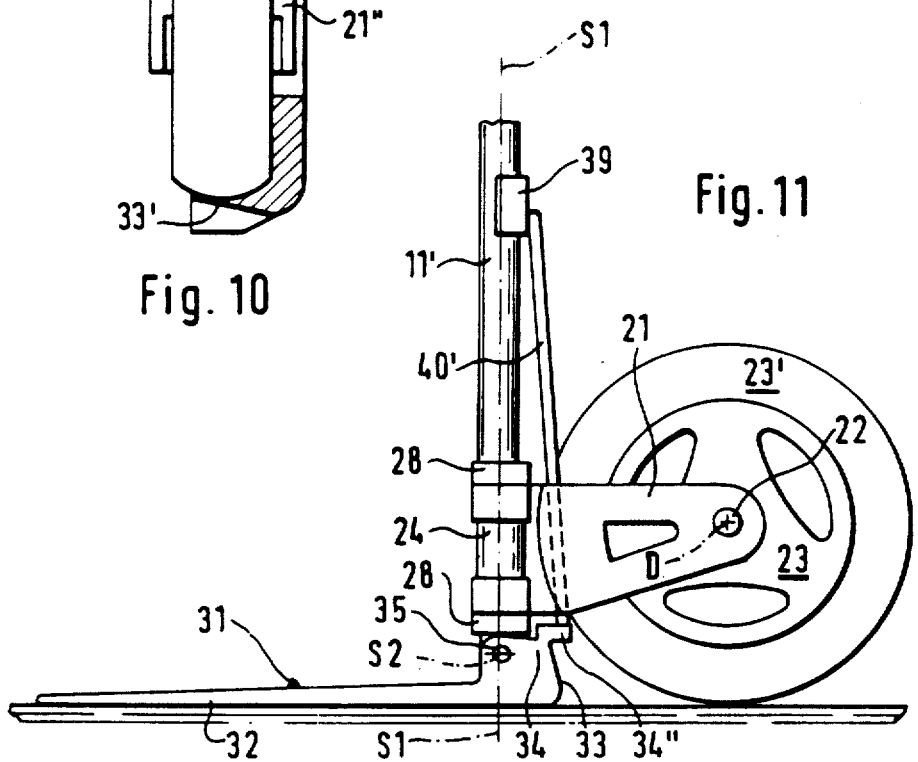
FIG. 11 is a fragmentary side elevational view of a lower portion of the hand truck depicted in FIG. 9, with the carrier member and the wheel braces in their unfolded positions.

FIG. 11 shows the lower end of the barrow according with the carrier member 31A and wheel 23A unfolded. The tire 23A' is resting on a ground surface, upon which the main plate 32A is also resting. One of the brackets 34A may include a rearward extension 34A". To obtain a rearwardly directed static friction torque, an elastic connecting element 40A', preferably a rubber tubing, is extended from the block extension 34A" to the lower crossbar 39A, the elastic force whereof produces a counter torque and prevents the tipping of the vertical frame.

In FIG. 12a, the lower end of the lower profile is shown, upon which the bushing 24A of the wheel brace 21A is set wherein two set rings 28A mounted on the lower profile 11A' prevent vertical movement of the bushing while permitting it to rotate around the pivot axis S1. The fork-like wheel braces 21A with the two brace plates 21A and 21A" have bores to receive the axle 22A of the wheel. Mounted to the two wheel braces, near the bushing 24A is a V-shaped projection or shoulder 37A. The lower safety ring 28A has a projection 28A' on its outer side permitting the pivoting of the wheel brace past its operative position by about 10 degrees. This pivoting facilitates the erection of the barrow. That is, if the barrow is prone and folded, and the wheel braces 21A on both sides are then unfolded upwardly past their 90 degree operative or set position, the wheel braces will be in a stable equilibrium state, so that their undesirable return by gravity into the folded position is prevented, until the carrier member is unfolded.

As will be explained, both wheel braces 21A are necessarily brought into their 90 degree operative position by an oblique surface of a safety structure 38A. The lower end 19A of the lower long profile 11A' is supported pivotingly around the axis S2 by means of a pin 35A. The pivot axis S2 extends at right angles to the axis S1, while the axis S2 and the rotating axle D are parallel to each other. The brackets 34A have rear extensions 34A', in addition to the afore-described extensions 34A", which define a V-shaped notch 38A for receiving the V-shaped projection 37A of the wheel brace to provide a positive safety lock following the unfolding of the scoop around the axis S2. The positive lock immobilizes the folded-out wheel brace in its 90 degree operative position, with the grip becoming tighter with increasing loads on the plate 32A, since those loads tend to impart to the carrier member a rotary force tending to resist downward movement of the back plate 33A, similar to the action occurring in connection with the earlier-described embodiment of FIGS. 1-8.

Another embodiment of the hand truck is shown in FIGS. 13 and 14, wherein a bottom portion 27B, 27B' of the lower frame part is separable from a top portion 11B" thereof. This makes possible a further reduction of the size of the folded barrow in that the running gear may be set transversely inside the folded vertical frame. The folded transverse frame comprises upper profiles 11B" connected with each other by a handle 12B acting as a cross-stay. The upper profiles are pivoted to profiles 11B', around the pivot axis S1. The profiles are secured in the above-described manner by the lock catches 14B, regardless of whether the center crossbar 16 is coaxial (as shown) relative to the axle S3 of the upper frame part. In order to obtain the separation of the bottom portion of the lower frame part from the top portion thereof, the lower ends of the lower profiles 11B' have plug-in ends 17B, equipped with stops 18B' limiting the depth of their insertion and locking noses 18B" to prevent their undesired retraction. The separated running gear is located transversely inside the folded vertical frame, with the wheel braces 21B articulated onto the bent ends 27B' of the crossbar 27B by means of bushings 24B. A carrier member 32B is pivotably mounted to the bent ends for rotation about axis S2. The crossbar 27B is equipped with insertion receptacles 25B, into which the plug-in ends 17B of the lower profiles 11B' may be releasably inserted. The configuration of one plug-in connection is shown in detail in FIG. 14, the other connection being a mirror image thereof. The insertion receptacle 25 is set in the crossbar 27B at any desired location. (In FIG. 14, the crossbar 27B has been rotated by 90 degrees about its own longitudinal axis out of the position in which it would be receiving the plug-in end 17B, in order to depict the shape of the receptacle 25B.) The spacing between the two plug-in ends 17B is greater than the spacing between the two receptacles by a distance 2b prior to insertion of the plug-in ends into the receptacles. Thus, in order to insert the plug-in ends into the receptacles, it is necessary to squeeze together the lower ends of the lower profiles 11B' by distance 2b, whereupon each lower profile 11B' will be biased outwardly as it rests in its receptacle 25B. Accordingly, the nose 18B" will prevent the plug-in end from being accidentally dislodged from the receptacle.

The depth of insertion of the plug-in end 17B is limited by the stop 18B' with the distance between the stop 18B' and the locking nose 18B" being equal to the height of the insertion receptacle 25B. To better secure the locked connection, the receptacle 25B is designed so that a beveled surface 26B defines a receptacle width which narrows from a large width to a small width, the latter being substantially equal to the diameter of the plug-in end.

Instead of requiring the plug-in ends 25B to be squeezed together, it could be required that they be spread apart. After the running gear has been separated form the frame, it is rotated 90 degrees, placed inside the frame and secured thereto by clamps 29B.

In all of the afore-described embodiments, the thickness of the folded barrow is determined essentially by the width of the wheel. The folded state is secured by the elastic clamping effects of the wheel tires engaging the carrier member or possibly the crossbar 27, and possibly aided by the elastic closing plugs 35A. In order to operate the barrow without difficulty, the wheel braces with their wheels must not "flutter". To eliminate this, the wheel brace is immobilized by the unfolded carrier member, wherein cone, wedge or V-shaped couplings (e.g., 36', 38A) perform a satisfactory fixation of the unfolded wheel braces which becomes stronger with rising loads on the carrier member. The cone, wedge or V-shaped coupling makes it possible further to pivot the wheel braces past their 90 degree position during the initial unfolding of the wheel braces to minimize a tendency for the wheels to fall back to a folded condition. Then, the cone, wedge, or V-shape coupling is effected to shift the wheels back to an operating position, due to the enlarged upper end of the recess 33' or 38A which facilitates a "capture" of the wheel brace.

The upper frame part of the divided vertical frame may be folded 180 degrees into the lower frame to achieve a coplanar relationship. In FIG. 9, the grip handle can extend sufficiently far down that it is retained between the crossbar 39A and the scoop plate 32A. The folded frames are secured by lock catches U-shaped in their cross-section, which also transmit the bending moments generated during operation. An elastic clamping part secures the catches against unintentional opening. If the barrow is to be folded, initially the catches must be rotated outward, whereupon the upper frame part is folded down and finally the catches are tilted back to secure the frame position. A lower cross-stay is provided with a hole/slot combination, into which an elastic rubber strap may be introduced and immobilized. In this manner, carried objects may be secured with variable spacing, so that even small loads do not fall through the intermediate spaces. In order to prevent the tilting of the vertical frame upon stopping, elastic plugs are provided in the area of the articulation of the carrier member, which by mutual clamping with the main plate of the carrier member prevent the tilting over of the vertical frame. Alternatively, an elastic tension element may produce a counter torque from the back plate of the carrier member to the lower crossstay, which prevents tilting. Also, it supports the erection of the barrow at least during the unfolding of the carrier member. In order to be able to equip the barrow with wheels without too small diameters, it is advantageous to design the vertical frame above the running gear with a decreasing width, either by means of a projecting cross-stay on the side of the running gear or by outwardly directed bends of the lower long profiles of the vertical frame. The load carrying surface of the carrier member itself advantageously is provided with an anti-slip structure or coating.

Although the present invention has been described in connection with preferred embodiments thereof, it will be appreciated by those skilled in the art that additions, modifications, substitutions, and deletions not specifically described may be made without departing from the spirit and scope of the invention, as defined in the appended claims.

What is claimed is:
1. A hand truck comprising:
   a frame including
      a lower frame part, and
      an upper frame part having a handle and being collapsible toward said lower frame part,
   a pair of wheel braces pivotably mounted to a bottom portion of said lower frame part for pivotal movement about respective axes between folded and unfolded positions, free ends of said wheel braces carrying ground support wheels, and
   a carrier member pivotably mounted to said bottom portion of said lower frame part for pivotal movement between folded and unfolded positions, about an axis extending substantially perpendicular to said axes,
   said wheels including elastomeric tires frictionally engaging portions of said carrier member when said wheel braces and said carrier member are in their folded positions, in order to resist unfolding of said wheel braces.

2. A hand truck according to claim 1, wherein said portions of said carrier member engaged by said tires comprise recesses which are curved in conformance with a peripheral shape of said tires.

3. A hand truck according to claim 2, wherein said carrier member includes a main plate and a back plate oriented at a right angle to said main plate, said recesses being formed in said back plate.

4. A hand truck according to claim 1, wherein said wheel braces are fixed against movement in a direction parallel to said axes about which they rotate.

5. A hand truck according to claim 1, wherein said carrier member includes locking means for engaging said wheel braces when said carrier member and said wheel braces are in their unfolded positions, to retain said wheel braces in their unfolded positions.

6. A hand truck according to claim 5, wherein said wheel braces contain projections, said locking means comprising recess means carried by said carrier member for receiving said projections when said carrier member and said wheel braces are unfolded, said recess means including walls which converge in a direction in which said projection enters said recess means.

7. A hand truck according to claim 1 including stop means for limiting the distance which said wheel brace can be pivoted from said folded position to said unfolded position, said distance being slightly greater than 90 degrees.

8. A hand truck according to claim 1, wherein said upper frame part is pivotably mounted to said lower frame part by a pivot axis for generally 180 degree pivotal movement between an upper unfolded position and a lower folded position, locking means being movable between an unlocking position permitting said upper frame part to pivot and a locking position preventing said upper frame part from pivoting.

9. A hand truck according to claim 8, wherein said upper frame part comprises a pair of parallel upper profile tubes interconnected by said handle, said lower frame part comprising a pair of lower profile tubes having mutually parallel top portions connected to said upper frame part adjacent said pivot axis thereof, said locking means comprising a pair of catches mounted to one of said upper and lower frame parts for rotation relative to both of said upper and lower frame parts in order to move between said unlocking and locking positions, each of said catches being arranged, when in its locking position, to engage an upper profile tube and a lower profile tube to prevent rotation of said upper frame part out of its folded and unfolded position.

10. A hand truck according to claim 8, wherein said carrier member includes locking means for engaging said wheel braces when said carrier member and said wheel braces are in their unfolded positions, to retain said wheel braces in their unfolded positions.

11. A hand truck according to claim 1 including an elastomeric member extending between said frame and said carrier member to resist tipping of said frame.

12. A hand truck according to claim 1, wherein said frame includes a pair of crossbars and means extending between said crossbars to support objects disposed on said carrier member.

13. A hand truck comprising:
   a frame including
      a lower frame part,
      an upper frame part having a handle and pivotably mounted to said lower frame part about a first axis for generally 180 degree movement between an upper unfolded position and a lower folded position, and first locking means movable between an unlocking position permitting said upper frame part to pivot about said first axis and a locking position preventing said upper frame part from pivoting about said first axis, a pair of wheel braces pivotably mounted to a bottom portion of said lower frame part for pivotal movement between folded and unfolded positions about second axes extending substantially perpendicular to said first axis, free ends of said wheel braces carrying ground support wheels, and a carrier member pivotably mounted to said bottom portion of said lower frame part for pivotal movement between folded and unfolded positions about a third axis extending substantially parallel to said first axis, said upper frame part comprising a pair of parallel upper profile tubes interconnected by said handle, said lower frame part comprising a pair of lower profile tubes having mutually parallel top portions connected to said upper frame part adjacent said first axis, said first locking means comprising a pair of catches mounted to one of said upper and lower frame parts for rotation relative to both of said upper and lower frame parts about a fourth axis in order to move between said unlocking and locking positions, each of said catches being arranged, when in its locking position, to engage a respective upper profile tube and a respective lower profile tube to prevent rotation of said upper frame part out of its folded and unfolded positions.

14. A hand truck according to claim 13, wherein each of said catches is of U-shaped cross-section and arranged to simultaneously overlap profile tubes of both of said upper and lower frame pats when said catch is in its locking position, in order to prevent pivotal movement of said upper frame part.

15. Apparatus according to claim 13, wherein each of said catches has means for yieldably gripping one of said upper and lower frame parts when said catch is in its locking position.

16. Apparatus according to claim 13, wherein said upper frame part includes a crossbar spaced from, and disposed parallel to, said first axis, elastic plugs mounted in opposite ends of said crossbar and arranged to frictionally engage said lower frame part in one of said folded and unfolded positions of said upper frame part.

17. Apparatus according to claim 13, wherein said upper portions of said profile tubes of said lower frame part have elastic tubes mounted in their uppermost ends and arranged in frictional contact with said catches when said catches are in their locking positions.

18. A hand truck comprising:
a frame including
a lower frame part,
an upper frame part having a handle and pivotably mounted to said lower frame part about a first axis for generally 180 degree movement between an upper unfolded position and a lower folded position, and first locking means movable between an unlocking position permitting said upper frame part to pivot about said first axis and a locking position preventing said upper frame part from pivoting about said first axis, a pair of wheel braces pivotably mounted to a bottom portion of said lower frame part for pivotal movement about second axes extending substantially perpendicular to said first axis, free ends of said wheel braces carrying ground support wheels, each of said wheel braces being pivotable about its respective second axis between folded and unfolded positions, and a carrier member pivotably mounted to said bottom portion of said lower frame part for pivotal movement between folded and unfolded positions about a third axis extending substantially parallel to said first axis, said carrier member including a main carrier plate and second locking means movable with said main carrier plate and engageable with said wheel braces when said carrier member and said wheel braces are in their unfolded positions, to retain said wheel braces in their unfolded positions, said frame carrying stop means for limiting the distance which each wheel brace can be pivoted from said folded position to said unfolded position, said distance being slightly greater than 90 degrees.

19. A hand truck according to claim 18, wherein said wheel braces contain projections, said second locking means comprising recess means carried by said carrier member for receiving said projections when said carrier member and said wheel braces are unfolded, said recess means including walls which converge in a direction in which said projection enters said recess means.

* * * * *